United States Patent
Shiba et al.

(10) Patent No.: US 9,721,699 B2
(45) Date of Patent: Aug. 1, 2017

(54) WATER-STOP STRUCTURE FOR WIRE HARNESS

(71) Applicant: Sumitomo Wiring Systems, Ltd., Yokkaichi, Mie (JP)

(72) Inventors: Gen Shiba, Yokkaichi (JP); Kazuhiro Hoshino, Yokkaichi (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 162 days.

(21) Appl. No.: 14/528,838

(22) Filed: Oct. 30, 2014

(65) Prior Publication Data

US 2015/0122544 A1    May 7, 2015

(30) Foreign Application Priority Data

Nov. 1, 2013   (JP) ................. 2013-228433

(51) Int. Cl.
*H01B 7/18* (2006.01)
*H01B 7/282* (2006.01)
(Continued)

(52) U.S. Cl.
CPC ............ *H01B 7/2825* (2013.01); *H01R 4/70* (2013.01); *H02G 3/0481* (2013.01); *H02G 15/1806* (2013.01); *H02G 15/046* (2013.01)

(58) Field of Classification Search
CPC ........ B29C 61/0608; B60R 16/02; B62J 6/18; H01B 7/00; H01B 7/0045; H01B 7/282; H01B 7/2825; H01R 4/70; H02G 3/04; H02G 3/0481; H02G 15/046; H02G 15/115; H02G 15/182; H02G 15/1806;
(Continued)

(56) References Cited

U.S. PATENT DOCUMENTS 4,124,983 A * 11/1978 Weatherby ................ E02D 5/76
                                                                174/DIG. 8
5,755,465 A *  5/1998 Stewart, Jr. ........ H02G 15/1806
                                                                156/86
(Continued)

FOREIGN PATENT DOCUMENTS

JP    2004350382 A  * 12/2004
JP    2004350382 A  * 12/2004
JP    2012-200110 A   10/2012

OTHER PUBLICATIONS 3M-heat-shrink-tubing-eps-300—Aug. 2011.*

*Primary Examiner* — Timothy Thompson
*Assistant Examiner* — Guillermo Egoavil
(74) *Attorney, Agent, or Firm* — Studebaker & Brackett PC

(57) ABSTRACT

A water-stop structure including a water-stop tube is provided in which the water-stop tube can be brought into intimate contact with a water-stop region in a wire harness having a steep thickness gradient and thus water-stop performance is improved. The wire harness includes a first portion and a second portion that is thinner than the first portion. An inner water-stop tube covers the water-stop region ranging from the first portion to the second portion in a state where the inner water-stop tube is heated and shrunk. An outer water-stop tube covers the inner water-stop tube at a position between a portion on the first portion side and a portion on the second portion side in the water-stop region in a state where the outer water-stop tube is heated and shrunk.

1 Claim, 3 Drawing Sheets

(51) Int. Cl.
  *H01R 4/70* (2006.01)
  *H02G 3/04* (2006.01)
  *H02G 15/18* (2006.01)
  *H02G 15/04* (2006.01)

(58) Field of Classification Search
  CPC ...... E02D 5/76; Y10S 174/08; Y10S 285/915; Y10S 439/932
  USPC ................ 156/86; 174/72 A, 88 R, 93, 107, 174/DIG. 8; 285/381.5, 915; 405/259.5, 405/262; 439/932
  See application file for complete search history.

(56) References Cited

U.S. PATENT DOCUMENTS

| | | |
|---|---|---|
| 8,367,927 B2 | 2/2013 | Sawamura |
| 2004/0262025 A1* | 12/2004 | Brandt ................ H02G 15/115 174/88 R |
| 2009/0314511 A1* | 12/2009 | Hagi ...................... H01R 4/726 174/78 |
| 2012/0318575 A1 | 12/2012 | Koto |

\* cited by examiner

WATER-STOP STRUCTURE FOR WIRE HARNESS

TECHNICAL FIELD

The present invention relates to a water-stop structure for a wire harness that stops water with a tube in a water-stop region ranging from a thick portion to a thin portion in the wire harness.

BACKGROUND ART

As described in JP 2012-200110A, in a wire harness, a heat-shrinkable water-stop tube sometimes stops water in a water-stop region including a portion in which core wires of insulated electric wires are exposed. The heat-shrinkable water-stop tube has a two-layer structure including a heat-shrinkable tube and a thermoplastic adhesive layer formed on the inner side surface of the heat-shrinkable tube.

The water-stop tube is brought into intimate contact with the water-stop region of the wire harness by a shrinking action of the heat-shrinkable tube and an adhesiveness of the adhesive, and thus high water-stop performance is secured.

Also, the water-stop tube sometimes covers a water-stop region ranging from a thick portion to a thin portion in the wire harness. For example, in the water-stop structure described in JP 2012-200110A, the water-stop tube covers a water-stop region ranging from a relatively thick electric wire bundle to one electric wire that is thinner than the electric wire bundle.

JP 2012-200110A is an example of related art.

SUMMARY OF THE INVENTION

Incidentally, when the water-stop region ranging from the thick portion to the thin portion in the wire harness has a steep thickness gradient, the intermediate portion between both end portions of the water-stop tube may come into insufficiently intimate contact with the water-stop region of the wire harness. It is conceivable that this is because a portion on one side of the water-stop tube that covers the thin portion of the water-stop region cannot be sufficiently shrunk by the influence of a portion on the other side that is shrunk to a relatively thick state. In this case, it is impossible to secure sufficient water-stop performance.

It is an object of the present invention to provide a water-stop structure, including a water-stop tube, in which the water-stop tube can be brought into intimate contact with a water-stop region of a wire harness having a steep thickness gradient and thus water-stop performance is improved.

A water-stop structure for a wire harness according to the first aspect includes a wire harness, an inner water-stop tube, and an outer water-stop tube. The wire harness has a first portion and a second portion that is thinner than the first portion. Both of the inner water-stop tube and the outer water-stop tube have a two-layer structure that includes a heat-shrinkable tube and a thermoplastic adhesive layer formed on an inner side surface of the heat-shrinkable tube. The inner water-stop tube covers a water-stop region ranging from the first portion to the second portion in the wire harness in a state where the inner water-stop tube is heated and shrunk. The outer water-stop tube covers the inner water-stop tube at a position between a portion on the first portion side and a portion on the second portion side in the water-stop region in the wire harness in a state where the outer water-stop tube is heated and shrunk.

A water-stop structure for a wire harness according to the second aspect is an aspect of the water-stop structure for a wire harness according to the first aspect. In the water-stop structure for a wire harness according to the second aspect, the inner water-stop tube includes a first inner water-stop tube and a second inner water-stop tube that respectively cover a partial region on the first portion side and a partial region on the second portion side in the water-stop region in the wire harness. In this case, the outer water-stop tube covers a portion ranging from a portion of the first inner water-stop tube to a portion of the second inner water-stop tube in the inner water-stop tube.

A water-stop structure for a wire harness according to the third aspect is an aspect of the water-stop structure for a wire harness according to the second aspect. In the water-stop structure for a wire harness according to the third aspect, a maximum shrinkage percentage in a radial direction of the heated first inner water-stop tube is smaller than a maximum shrinkage percentage in a radial direction of the heated second inner water-stop tube.

In the above-described aspects, when heated, the outer water-stop tube tightens the inner water-stop tube that is in direct contact with the water-stop region of the wire harness from the outside at the intermediate position in which the gap between the inner water-stop tube and the water-stop region is likely to be formed. Therefore, even if the water-stop region ranging from the first portion to the second portion has a steep thickness gradient, the inner water-stop tube can be brought into intimate contact with the water-stop region. As a result, it is possible to improve water-stop performance of the water-stop structure.

Moreover, in the second aspect, the inner water-stop tube is divided into the first inner water-stop tube on the thick first portion side and the second inner water-stop tube on the thin second portion side. In this case, the second inner water-stop tube is easily shrunk to a thinner state without the influence of the first inner water-stop tube, which is shrunk to a relatively thick state. Furthermore, the outer water-stop tube tightens the portion ranging from a portion of the first inner water-stop tube to a portion of the second inner water-stop tube from the outside and fills the gap therebetween. As a result, it is possible to improve water-stop performance of the water-stop structure.

In the third aspect, the first inner water-stop tube is a water-stop tube that has a thickness corresponding to the thickness of the relatively thick first portion to be covered and has a small maximum shrinkage percentage. Generally, a water-stop tube (heat-shrinkable tube) having a small maximum shrinkage percentage is more inexpensive than a water-stop tube having a large maximum shrinkage percentage. Therefore, with the third aspect, it is possible to reduce the cost of the water-stop structure while securing sufficient water-stop performance.

EMBODIMENTS OF THE INVENTION

Hereinafter, embodiments of the present invention will be described with reference to the attached drawings. The following embodiments are merely specific examples of the present invention, and are not to restrict the technical scope of the present invention. The embodiments and an application example shown below are applied to a wire harness that is mounted in a vehicle such as a car.

First Embodiment

First, the water-stop structure 1 of a wire harness according to a first embodiment will be described with reference to FIGS. 1 and 2. Hereinafter, the water-stop structure 1 of a wire harness is referred to as "water-stop structure 1" for short.

Figure 1:
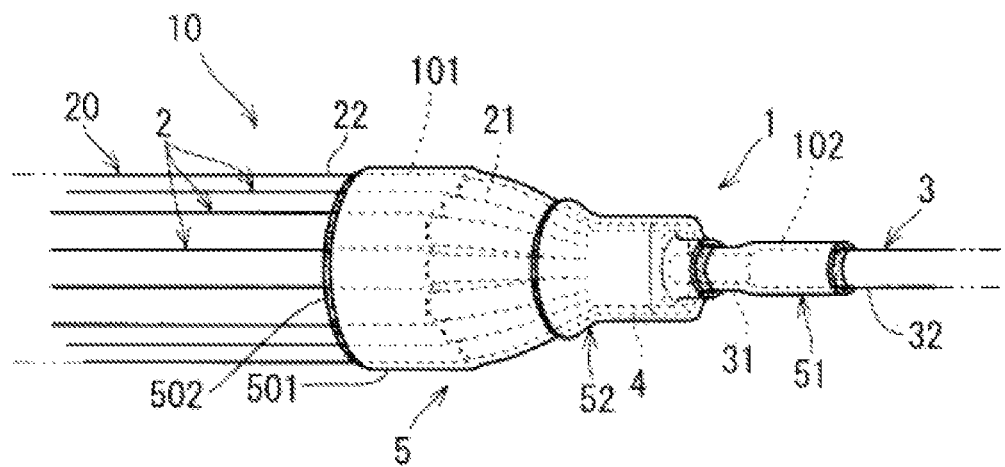
FIG. 1 is a schematic perspective view of a water-stop structure 1 of a wire harness according to a first embodiment.
Figure 2:
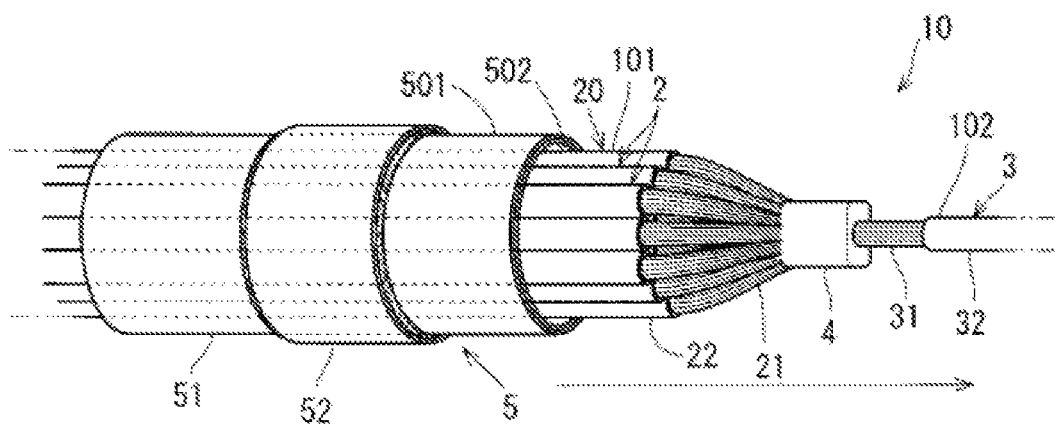
FIG. 2 is a perspective view of components of the water-stop structure 1 of a wire harness.

As shown in FIGS. 1 and 2, the water-stop structure 1 includes an electric wire bundle 10 with an intermediate joint portion, which is an example of a wire harness, and a water-stop tube group 5. The water-stop tube group 5 includes an inner water-stop tube 51 and an outer water-stop tube 52.

The electric wire bundle 10 with an intermediate joint portion includes a second electric wire 3 and an electric wire bundle 20 including a plurality of first electric wires 2, and has a structure in which the electric wire bundle 20 and the second electric wire 3 are connected to each other. The first electric wires 2 are insulated electric wires having a linear conductor 21 and an insulating coating 22 that covers the circumference of the conductor 21. Similarly, the second electric wire 3 is also an insulated electric wire having a linear conductor 31 and an insulating coating 32 that covers the circumference of the conductor 31.

The end portions of the conductors 21 of the first electric wires 2 are formed to extend from the ends of the insulating coatings 22, and similarly, the end portion of the conductor 31 of the second electric wire 3 is formed to extend from the end of the insulating coating 32. Furthermore, the end portions of the conductors 21 of the first electric wires 2 and the end portion of the conductor 31 of the second electric wire 3 are joined by welding, crimping of metal fittings, or the like to form a joint portion 4. In the example shown in FIG. 2, the joint portion 4 is a portion in which the conductors 21 of the first electric wires 2 and the conductor 31 of the second electric wire 3 are welded to each other.

In the following description, in the electric wire bundle 10 with an intermediate joint portion, a portion in which the end portions of the insulating coatings 22 of the first electric wires 2 are bundled is referred to as "first portion 101", and the end portion of the insulating coating 32 of the second electric wire 3 is referred to as "second portion 102".

In the electric wire bundle 10 with an intermediate joint portion, the region ranging from the first portion 101 to the second portion 102 is the water-stop region that is covered with the water-stop tube group 5 and thus is sealed. In the electric wire bundle 10 with an intermediate joint portion, the second portion 102 is thinner than the first portion 101.

In the examples shown in FIGS. 1 and 2, the region ranging from the first portion 101 to the second portion 102 in the electric wire bundle 10 with an intermediate joint portion has a steep thickness gradient. The steeper the gradient is, the more remarkable the effect by using the water-stop tube group 5, which will be described later, is.

Both of the inner water-stop tube 51 and the outer water-stop tube 52 that constitute the water-stop tube group 5 have a two-layer structure including a heat-shrinkable tube 501 and a thermoplastic adhesive layer 502 formed on the inner side surface of the heat-shrinkable tube 501. FIG. 2 shows the inner water-stop tube 51 and the outer water-stop tube 52 before shrinkage.

In the water-stop structure 1, the inner water-stop tube covers the water-stop region ranging from the first portion 101 to the second portion 102 in the electric wire bundle 10 with an intermediate joint portion (wire harness) in a state where the inner water-stop tube is heated and shrunk.

The inner side surface of the inner water-stop tube 51 is in direct contact with the water-stop region. More specifically, the heat-shrinkable tube 501 of the inner water-stop tube 51 is adhered to the water-stop region in the electric wire bundle 10 with an intermediate joint portion by the adhesive layer 502 on the inner side of that heat-shrinkable tube 501. The adhesive layer 502 of the inner water-stop tube 51 fills the gap between the heat-shrinkable tube 501 of the inner water-stop tube 51 and the water-stop region.

On the other hand, the outer water-stop tube 52 covers the inner water-stop tube 51 at the position between a portion on the first portion 101 side and a portion on the second portion 102 side in the water-stop region of the electric wire bundle 10 with an intermediate joint portion (wire harness) in a state where the outer water-stop tube 52 is heated and shrunk.

The heat-shrinkable tube 501 of the outer water-stop tube 52 is adhered to the outer circumferential surface of the inner water-stop tube 51 by the adhesive layer 502 on the inner side of that heat-shrinkable tube 501.

For example, it is conceivable that the maximum shrinkage percentage in a radial direction of the heated outer water-stop tube 52 is greater than the maximum shrinkage percentage in a radial direction of the heated inner water-stop tube 51. Here, a shrinkage percentage is a ratio of the difference between the dimensions before and after shrinkage with respect to the dimension before shrinkage. Moreover, a maximum shrinkage percentage is a shrinkage percentage when the heat-shrinkable tube is heated in a state where nothing is inserted into the inside to have the smallest thickness, that is, the shrinkage percentage of the heat-shrinkable tube in specifications.

Accordingly, if water-stop tubes before shrinkage have the same diameters, the water-stop tubes having a large maximum shrinkage percentage can be shrunk to a thinner state than the water-stop tubes having a small maximum shrinkage percentage.

In the example shown in FIG. 2, the outer water-stop tube 52 has been adhered to the outer circumferential surface of the inner water-stop tube 51 by the adhesive layer 502 on the inner side of the outer water-stop tube 52 in advance, and thus is integrated with the inner water-stop tube 51.

However, it is conceivable that the inner water-stop tube 51 is inserted into the inside of the outer water-stop tube 52 without being adhered, and then the inner water-stop tube 51 and the outer water-stop tube 52 are heated in the water-stop region.

Effects

In the water-stop structure 1, when heated, the outer water-stop tube 52 tightens the inner water-stop tube 51 that is in direct contact with the water-stop region in the electric wire bundle 10 with an intermediate joint portion from the outside at the intermediate position in which the gap between the inner water-stop tube 51 and the water-stop region is likely to be formed. Therefore, even if the water-stop region ranging from the first portion 101 to the second portion 102 has a steep thickness gradient, the inner water-stop tube 51 can be brought into intimate contact with the water-stop region. As a result, the water-stop structure 1 has high water-stop performance.

Second Embodiment

Next, a water-stop structure 1A of a wire harness according to a second embodiment will be described with reference to FIGS. 3 and 4. Hereinafter, the water-stop structure 1A of a wire harness is referred to as "water-stop structure 1A" for short.

The water-stop structure 1A has a configuration in which some components are added to the water-stop structure 1 shown in FIG. 1. In FIGS. 3 and 4, the same components as the components shown in FIGS. 1 and 2 are denoted by identical reference numerals. Hereinafter, the difference between the water-stop structure 1A and the water-stop structure 1 will be described.

Figure 3:
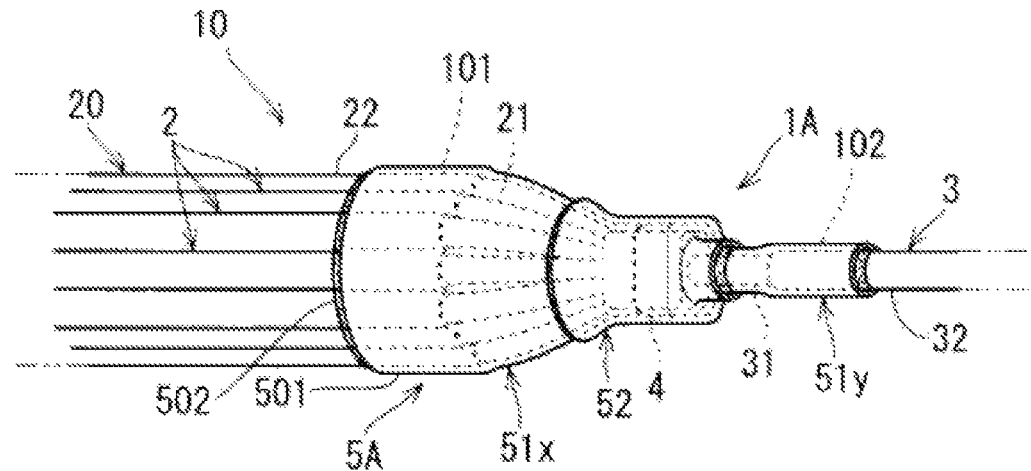
FIG. 3 is a schematic perspective view of a water-stop structure 1A of a wire harness according to a second embodiment.
Figure 4:
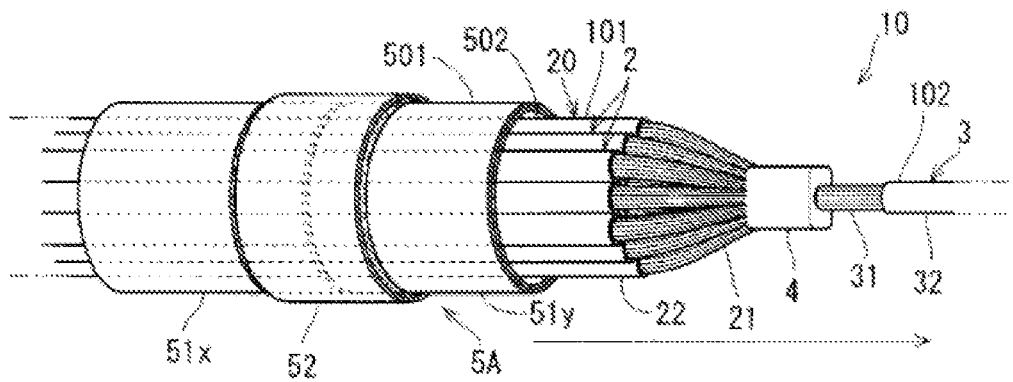
FIG. 4 is a perspective view of components of the water-stop structure 1A of a wire harness.

As shown in FIGS. 3 and 4, the water-stop structure 1A includes the electric wire bundle 10 with an intermediate joint portion and a water-stop tube group 5A. The water-stop tube group 5A includes a first inner water-stop tube 51x and a second inner water-stop tube 51y, and the outer water-stop tube 52.

The first inner water-stop tube 51x and the second inner water-stop tube 51y cover the water-stop region in the electric wire bundle 10 with an intermediate joint portion in a state where they are heated and shrunk. The first inner water-stop tube 51x covers a partial region on the first portion 101 side in the water-stop region, and the second inner water-stop tube 51y covers a partial region on the second portion 102 side in the water-stop region.

On the other hand, the outer water-stop tube 52 covers the portion ranging from a portion of the first inner water-stop tube 51x to a portion of the second inner water-stop tube 51y in a state where the outer water-stop tube 52 is heated and shrunk. The outer water-stop tube 52 covers both of a portion of the first inner water-stop tube 51x and a portion of the second inner water-stop tube 51y at a position between a portion on the first portion 101 side and a portion on the second portion 102 side in the water-stop region in the electric wire bundle 10 with an intermediate joint portion (wire harness).

That is, the inner water-stop tube 51 of the water-stop structure 1 is divided into two portions including one portion on the first portion 101 side and the other portion on the second portion 102 side at the intermediate position to form the water-stop structure 1A.

It is conceivable that in the water-stop structure 1A, the maximum shrinkage percentage in a radial direction of the heated first inner water-stop tube 51x is smaller than the maximum shrinkage percentage in a radial direction of the heated second inner water-stop tube 51y. In this case, it is conceivable that the maximum shrinkage percentage in a radial direction of the heated outer water-stop tube 52 is equal to or greater than the maximum shrinkage percentage in a radial direction of the heated second inner water-stop tube 51y.

If the water-stop structure 1A is used, it is possible to attain the same effect as in the case where the water-stop structure 1 is used.

In the water-stop structure 1A, the inner water-stop tube is divided into two portions including the first inner water-stop tube 51x on the thick first portion 101 side and the second inner water-stop tube 51y on the thin second portion 102 side. In this case, the second inner water-stop tube 51y is easily shrunk to a thinner state without the influence of the first inner water-stop tube 51x, which is shrunk to a relatively thick state. Furthermore, the outer water-stop tube 52 tightens the portion ranging from a portion of the first inner water-stop tube 51x to a portion of the second inner water-stop tube 51y from the outside and fills the gap therebetween. As a result, the water-stop structure 1A has high water-stop performance.

Moreover, in the water-stop structure 1A, when the first inner water-stop tube 51x is a water-stop tube that has a thickness corresponding to the thickness of the relatively thick first portion 101 to be covered and has a small maximum shrinkage percentage, it is possible to reduce the cost while securing sufficient water-stop performance. This is because a water-stop tube (heat-shrinkable tube) having a small maximum shrinkage percentage is generally more inexpensive than a water-stop tube having a large maximum shrinkage percentage.

Application Example

Figure 5:
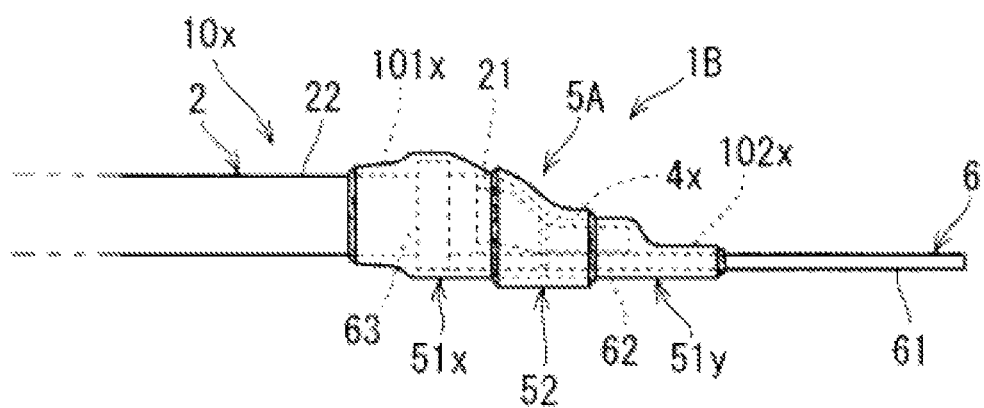
FIG. 5 is a side view of a water-stop structure 1B of a wire harness according to an application example.

Next, a water-stop structure 1B of a wire harness according to an application example will be described with reference to FIG. 5. FIG. 5 is a side view of the water-stop structure 1B of a wire harness. Hereinafter, the water-stop structure 1B of a wire harness is referred to as "water-stop structure 1B" for short.

The water-stop structure 1B differs from the water-stop structure 1A shown in FIG. 3 in that the water-stop structure 1B includes an electric wire 10x with a terminal as a wire harness for which the water-stop tube group 5A stops water. In FIG. 5, the same components as the components shown in FIGS. 1 to 4 are denoted by identical reference numerals. Hereinafter, the difference between the water-stop structure 1B and the water-stop structure 1A will be described.

The water-stop structure 1B includes the electric wire 10x with a terminal, which is an example of a wire harness, and a water-stop tube group 5A. The water-stop tube group 5A includes the inner water-stop tube 51 and the outer water-stop tube 52.

The electric wire 10x with a terminal includes the electric wire 2 and a terminal fitting 6 that is connected to the end portion of the electric wire 2. The electric wire is an insulated electric wire having the linear conductor 21 and the insulating coating 22 that covers the circumference of the conductor.

The terminal fitting 6 has a contact portion 61, a conductor-connecting portion 62, and a coating-crimping portion 63. The contact portion 61 is a portion that is connected to a connecting partner (another member) of the electric wire 10x with a terminal. The conductor-connecting portion 62 is a portion to which the conductor 21 extending from the end of the insulating coating 22 of the electric wire 2 is connected. The conductor 21 is connected to the conductor-connecting portion 62 by welding or crimping, for example.

Moreover, in the terminal fitting 6, the coating-crimping portion 63 is a portion that is crimped to the end portion of the insulating coating 22 of the electric wire 2. It should be noted that it is conceivable that the terminal fitting 6 includes no coating-crimping portion 63.

In the electric wire 10x with a terminal, a portion on the end portion side of the insulating coating 22 of the electric wire 2 is referred to as "first portion 101x", and a portion between the contact portion 61 and the conductor-connecting portion 62 in the terminal fitting 6 is referred to as "second portion 102$x$".

In the electric wire 10$x$ with a terminal, the region ranging from the first portion 101$x$ to the second portion 102$x$ is a water-stop region that is covered with the water-stop tube group 5A and thus is sealed. In the electric wire 10$x$ with a terminal, the second portion 102$x$ is thinner than the first portion 101$x$.

The steeper the thickness gradient of the region ranging from the first portion 101$x$ to the second portion 102$x$ in the electric wire 10$x$ with a terminal is, the more remarkable the effect by using the water-stop tube group 5A is.

The first inner water-stop tube 51$x$ and the second inner water-stop tube 51$y$ cover the water-stop region in the electric wire 10$x$ with a terminal in a state where they are heated and shrunk. The first inner water-stop tube 51$x$ covers a partial region on the first portion 101$x$ side in the water-stop region, and the second inner water-stop tube 51$y$ covers a partial region on the second portion 102$x$ side in the water-stop region.

On the other hand, the outer water-stop tube 52 covers the portion ranging from a portion of the first inner water-stop tube 51$x$ to a portion of the second inner water-stop tube 51$y$ in a state where the outer water-stop tube 52 is heated and shrunk. The outer water-stop tube 52 covers both of a portion of the first inner water-stop tube 51$x$ and a portion of the second inner water-stop tube 51$y$ at a position between a portion on the first portion 101$x$ side and a portion on the second portion 102$x$ side in the water-stop region in the electric wire 10$x$ with a terminal (wire harness).

It is conceivable that the magnitude relationship between the maximum shrinkage percentages in the radial direction of the heated water-stop tubes in the water-stop structure 1B is also the same as the relationship between the maximum shrinkage percentages of the tubes in the water-stop structure 1A.

If the water-stop structure 1B is used, it is possible to attain the same effect as in the case where the water-stop structure 1A is used. That is, it is conceivable that the water-stop structures 1 and 1A shown in FIGS. 1 and 3 can be applied to not only the electric wire bundle 10 with an intermediate joint portion but also other wire harnesses such as the electric wire 10$x$ with a terminal.

It should be noted that the water-stop structure for a wire harness according to the present invention can be configured by freely combining the above-described embodiments and application example, or modifying the embodiments and application example or omitting a portion thereof as appropriate, within the scope of the present invention described in claims.

LIST OF REFERENCE NUMERALS 1, 1A, 1B Water-stop structure
10 Electric wire bundle with an intermediate joint portion (wire harness)
10$x$ Electric wire with a terminal (wire harness)
101, 101$x$ First portion
102, 102$x$ Second portion
2 First electric wire (electric wire)
20 Electric wire bundle
21 Conductor of first electric wire
22 Insulating coating of first electric wire
3 Second electric wire
31 Conductor of second electric wire
32 Insulating coating of second electric wire
4 Joint portion
5, 5A Water-stop tube group
501 Heat-shrinkable tube
502 Adhesive layer
51 Inner water-stop tube
51$x$ First inner water-stop tube
51$y$ Second inner water-stop tube
52 Outer water-stop tube
6 Terminal fitting
61 Contact portion of terminal fitting
62 Conductor-connecting portion of terminal fitting
63 Coating-crimping portion of terminal fitting

What is claimed is:

1. A water-stop structure for a wire harness comprising:
a wire harness having a first portion and a second portion that is thinner than the first portion; and
an inner water-stop tube and an outer water-stop tube both having a two-layer structure that includes a heat-shrinkable tube and a thermoplastic adhesive layer formed on an inner side surface of the heat-shrinkable tube,
wherein the inner water-stop tube covers a water-stop region ranging from the first portion to the second portion in the wire harness in a state where the inner water-stop tube is heated and shrunk, and
the outer water-stop tube covers the inner water-stop tube at a position between a portion on the first portion side and a portion on the second portion side in the water-stop region in the wire harness in a state where the outer water-stop tube is heated and shrunk
wherein the inner water-stop tube includes a first inner water-stop tube and a second inner water-stop tube that respectively cover a partial region on the first portion side and a partial region on the second portion side in the water-stop region in the wire harness, and
the outer water-stop tube covers a portion ranging from a portion of the first inner water-stop tube to a portion of the second inner water-stop tube in the inner water-stop tube,
wherein a maximum shrinkage percentage in a radial direction of the heated first inner water-stop tube is smaller than a maximum shrinkage percentage in a radial direction of the heated second inner water-stop tube.

* * * * *